(12) United States Patent
Boguslawsky et al.

(10) Patent No.: US 10,345,044 B2
(45) Date of Patent: Jul. 9, 2019

(54) NON-CONTACT STRIP GUIDING

(71) Applicant: ANDRITZ Sundwig GmbH, Hemer (DE)

(72) Inventors: Klaus Boguslawsky, Hemer (DE); Jurgen Albrecht, Schwerle (DE)

(73) Assignee: ANDRITZ Sundwig GmbH, Hemer (DE)

( * ) Notice: Subject to any disclaimer, the term of this patent is extended or adjusted under 35 U.S.C. 154(b) by 268 days.

(21) Appl. No.: 15/212,759

(22) Filed: Jul. 18, 2016

(65) Prior Publication Data
US 2017/0023303 A1 Jan. 26, 2017

(30) Foreign Application Priority Data
Jul. 21, 2015 (AT) .................. 50638/2015

(51) Int. Cl.
| | |
|---|---|
| *F27B 9/40* | (2006.01) |
| *C22F 1/04* | (2006.01) |
| *C21D 9/63* | (2006.01) |
| *F27B 9/24* | (2006.01) |
| *F27B 9/30* | (2006.01) |
| *F27B 9/28* | (2006.01) |
| *F27D 11/06* | (2006.01) |
| *F27D 19/00* | (2006.01) |

(52) U.S. Cl.
CPC .................. *F27B 9/40* (2013.01); *C21D 9/63* (2013.01); *C22F 1/04* (2013.01); *F27B 9/2476* (2013.01); *F27B 9/28* (2013.01); *F27B 9/30* (2013.01); *F27D 11/06* (2013.01); *F27D 19/00* (2013.01); *F27D 2019/0071* (2013.01); *Y02P 10/253* (2015.11)

(58) Field of Classification Search
CPC ........................................................ C21D 9/63
USPC .................................................. 266/103, 104
See application file for complete search history.

(56) References Cited

U.S. PATENT DOCUMENTS

| | | | |
|---|---|---|---|
| 3,319,856 A | 5/1967 | Stanley | |
| 5,616,295 A * | 4/1997 | Tawara | ..................... C21D 9/63 266/103 |
| 2017/0023303 A1* | 1/2017 | Boguslawsky | ........... C22F 1/04 |
| 2017/0321298 A1* | 11/2017 | Baukloh | .................. C21D 9/63 |
| 2017/0327936 A1* | 11/2017 | Ishigaki | ..................... C23C 2/04 |

FOREIGN PATENT DOCUMENTS

JP          2004124191 A   *  4/2004

OTHER PUBLICATIONS

Machine translation of JP 2004-124191A (Year: 2004).*

* cited by examiner

*Primary Examiner* — Scott R Kastler
(74) *Attorney, Agent, or Firm* — Alix, Yale & Ristas, LLP

(57) ABSTRACT

A process and apparatus for controlling the strip run (4) of a metal strip (10) through a floating furnace (3). The strip run (4) is controlled contact-free with the aid of an electromagnetic device (1) that generates a Lorentz force acting transversely to the strip run.

15 Claims, 1 Drawing Sheet

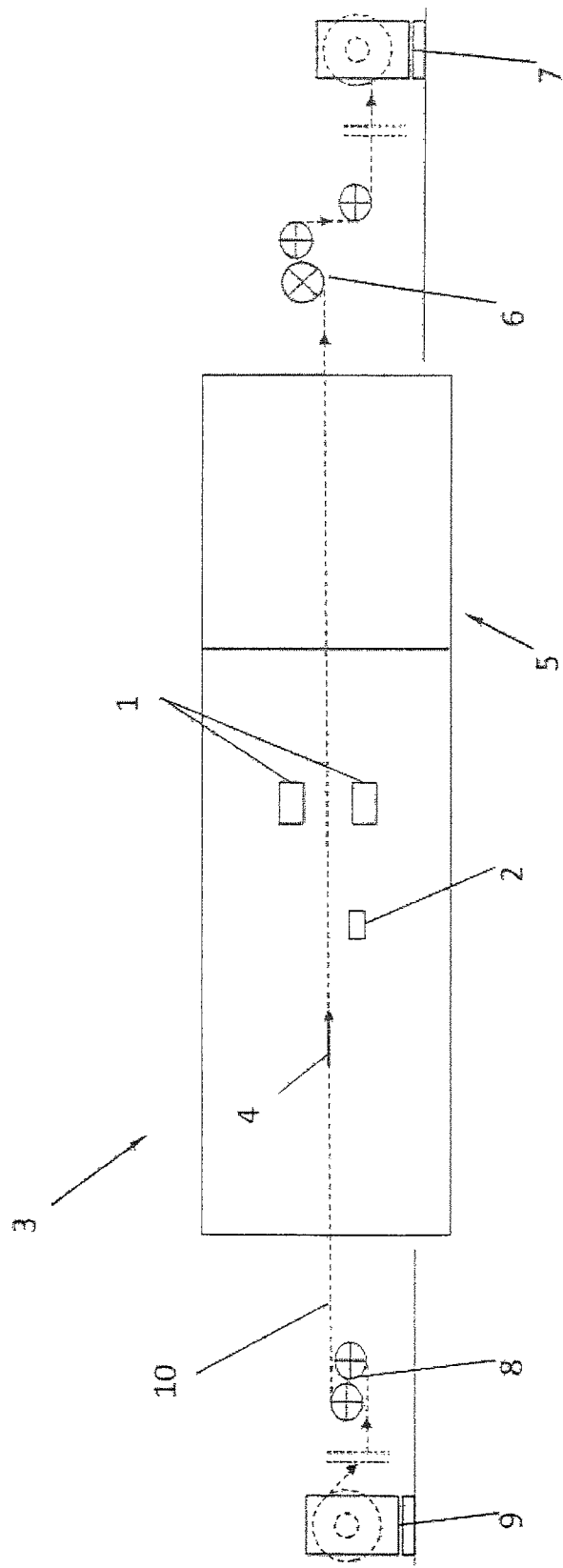

NON-CONTACT STRIP GUIDING

BACKGROUND

The present invention is directed to a process for controlling the strip run of a metal strip through a treatment device.

The treatment device is a floating furnace through which the metal strip is guided horizontally on air cushions, where the strip run is controlled inside the floating furnace. In conventional plants, the strip is usually guided by means of movable guide rolls that can be used to correct the strip run. However, a strip guiding device of this type is problematical in annealing furnaces because the guide rolls can damage the soft-annealed metal strip. Thus, the strip is currently guided by means of guide rolls arranged before and after the furnace.

The metal strip is conveyed through the furnace and along the subsequent cooling line while floating on air cushions. Modern horizontal floating furnaces including a cooling line can easily reach lengths in excess of 130 meters. Even if the metal strip is guided into the floating furnace in the center, there may be lateral drift inside the furnace. If the soft strip touches the wall of the furnace, it will be damaged. One possible solution would be to build the furnace much wider than the metal strip so that it can drift to the side to a certain extent without touching the walls. However, this would not make good use of the furnace capacity. Another possibility would be to mount mechanical limits on the furnace wall, but these limits could bend the sides of the metal strip upwards.

DE 1205291 describes a device for avoiding contact with the wall by means of a specially designed air cushion underneath the strip that centers the metal strip automatically. However, the strip run cannot be influenced actively.

SUMMARY

The object of the invention is to provide a method and device for controlling the strip run without damaging the metal strip.

From one aspect, the invention is a method for controlling transverse horizontal deviation of a metal strip passing horizontally in a running direction on air cushions through a treatment station, comprising subjecting the running strip to Lorentz forces acting transversely to the running direction.

From another aspect, the invention is directed to a method wherein the position of the strip is determined by a position sensor and lateral deviations in the strip run are controlled contact-free with the aid of a fixed electromagnetic device.

The electromagnetic device generates a Lorentz force, which acts on the metal strip. If the strip drifts to the side, this is detected by the position sensor, which activates the electromagnetic device via a signal processing device. The Lorentz force thus generated pushes the strip back into the correct position.

The standard expression that defines the Lorentz force is $F=qE+qv\times B$, where the force component $qE$ is based on an electrical field and the force component $qv\times B$ is based on a magnetic field. As used herein, "Lorentz force" refers to the force as defined by the above expression, whether or not an electric field E is present.

There is no damage to the strip due to the non-contact and thus low-wearing system.

The Lorentz force to control the strip run is preferably generated by means of adjustable electromagnets.

It is advantageous if the metal strip is made of nonferrous metal, especially aluminum and copper. In this type of strip, the adjustable electromagnets generate eddy currents, which in turn create a magnetic field that interacts with the magnetic field of the electromagnets and thus generates a force acting on the level of the strip in a direction perpendicular to the strip running direction. Lateral drift can be influenced in this way.

The AC electromagnets provide a time-varying magnetic field. With this time-varying magnetic field and the position of the electro magnets, Lorentz forces are created on the level of the strip, i.e., horizontal force towards the strip edges.

The electromagnetic device should preferably have windings, which are designed as hollow conductors and through which a cooling medium passes. Thus, adequate cooling of the electromagnetic device inside the floating furnace, which reaches temperatures of 700° C., can be achieved.

The cooling medium may be either water or a bio-based, dielectric coolant. Use of demineralized water is an advantage because the conductivity of the water increases sharply in the presence of impurities and this can lead to operational disruptions.

It is further advantageous if the electromagnets are surrounded by a ceramic cover as mechanical and thermal protection.

The invention is applicable to other kinds of processing stations where horizontal deviation of a metal strip passing horizontally in a running direction on air cushions can be controlled by subjecting the running strip to Lorentz forces acting transversely to the running direction. For example, if the metal strip is guided through a cooling line, i.e., through a cooling section, on an air cushion immediately after the floating furnace, where the strip run can also be controlled contact-free within this cooling section with the aid of another fixed electromagnetic device. Ideally, the floating furnace and the cooling section are directly connected to one another.

The invention also relates to a device to control the strip run of a metal strip, where the position of the metal strip is determined by means of a position sensor. Adjustable electromagnets arranged above and/or below the metal strip are used to control lateral drift by the metal strip. Thus, automatic strip guiding is possible without damage to the strip.

BRIEF DESCRIPTION OF THE DRAWING

An embodiment of the invention is described below with reference to the accompanying FIG. 1.

DETAILED DESCRIPTION

FIG. 1 shows a metal strip 10—in the present case an aluminum strip—uncoiled from a decoiler 9. The S-rolls 8 guide the aluminum strip 10 and maintain the strip tension before the strip is fed to the floating furnace 3. In the floating furnace 3, the aluminum strip 10 is transported contact-free with the aid of air cushions generated by injectors arranged above and below the strip and then annealed at temperatures of over 500° C.

The lateral drift of the aluminum strip 10 is measured with the aid of the position sensor 2, which may take any known form. The electromagnetic adjustment device is formed by electromagnets 1 located above and below the aluminum strip 10, but not touching it. In the event of lateral drift detected by sensor 2, the electromagnets 1 are activated and the lateral drift thus corrected perpendicular to the strip run 4. The electromagnets 1 can be controlled with the aid of a potentiometer, for example, which changes the direction and amplitude of the electromagnetic force.

Subsequently, the aluminium strip is guided through a cooling section 5 floating on an air cushion. The electromagnets 1 needed for strip guiding can also be arranged in the cooling section 5 or in the transition area between the annealing furnace 3 and the cooling line 5. The cooled and thus less sensitive aluminum strip 10 is then guided over a guide roll 6 and fed to a coiler 7.

The embodiment illustrated in the drawing merely constitutes a preferred version of the invention. The invention also covers other embodiments in which gentle strip guiding is needed.

The invention claimed is:

1. A method for controlling transverse horizontal deviation of a metal strip defining a level passing horizontally in a running direction on air cushions through a floating furnace, comprising: sensing a transverse position of the strip at a location along the running direction; and in response to a sensed deviation in the transverse position of the strip, controlling the transverse position of the running strip with contact-free forces applied by a controlled electromagnetic field, wherein said controlled electromagnetic field is generated by a fixed AC electromagnet device;

the metal strip is a nonferrous metal strip; and the electromagnet device induces eddy currents in the strip, which in turn create another magnetic field that interacts with the magnetic field of the electromagnet device to produce a Lorentz force on the level of the strip in a direction transverse to the strip running direction.

2. The method according to claim 1, wherein the electromagnetic device comprises hollow conductor windings and a cooling medium is passed through the electromagnetic device.

3. The method according claim 1, further comprising:

guiding the metal strip through a cooling line on an air cushion immediately after the floating furnace;

sensing the transverse position of the strip at a location along the running direction of the cooling line; and in response to sensed deviations in the transverse position of the strip in the cooling line, controlling the transverse position of the running strip with contact-free forces applied by another controlled electromagnetic field.

4. The method according to claim 1, wherein when the position of the sensed metal strip deviates, a control signal activates the electromagnetic device to generate said electromagnetic field.

5. A method for controlling transverse horizontal deviation of a metal strip defining a level passing horizontally in a running direction on air cushions through a treatment station, comprising: subjecting the running strip to Lorentz forces acting transversely to the running direction, wherein a primary electromagnetic field is generated by an AC electromagnet device;

the metal strip is a nonferrous metal strip; and the electromagnet device induces eddy currents in the strip, which in turn create another magnetic field that interacts with the primary magnetic field of the electromagnet device to produce the Lorentz force on the level of the strip in a direction transverse to the strip running direction.

6. The method according to claim 5, wherein the treatment station is an annealing furnace.

7. The method according to claim 5, wherein the treatment station is a cooling station following a furnace.

8. The method according to claim 7, wherein said AC electromagnet device is in a fixed position and generates a variable primary magnetic field which produces variable Lorenz forces.

9. The method according to claim 8, including controlling the variable magnetic field to adjust the direction and amplitude of the electromagnetic force acting on the strip.

10. The method according to 6, wherein the electromagnetic device includes coils and a cooling medium is passed through the coils.

11. A device for controlling a metal strip defining a level running in a running direction within a floating furnace, comprising: a running strip position sensor; and adjustable AC electromagnets responsive to the position sensor, arranged inside the floating furnace in spaced vertical alignment with the metal strip, for generating a Lorentz force acting on the metal strip transversely to the running strip on the level of the strip run, wherein a primary electromagnetic field is generated by the AC electromagnets;

the metal strip is a nonferrous metal strip; and the primary electromagnetic field generates eddy currents in the strip, which in turn create another magnetic field that interacts with the primary magnetic field to produce the Lorentz force on the level of the strip in a direction transverse to the strip running direction.

12. The device according to claim 11, wherein the AC electromagnets have coils in the form of hollow conductors through which a cooling medium passes.

13. The device according to claim 12, wherein the cooling medium is selected from the group consisting of water, demineralized water, and a bio-based dielectric fluid.

14. The device according to claim 11, wherein the electromagnets are shielded by a ceramic cover.

15. The device according to claim 11, including a metal strip passing along a running direction on a cushion of air through an annealing furnace; and wherein the position sensor is located within the furnace upstream of the electromagnets; and at least one electromagnet is situated in fixed position above the running strip and at least one electromagnet is situated in fixed position below the running strip.

* * * * *